(12) United States Patent
LeBaron

(10) Patent No.: US 11,291,171 B2
(45) Date of Patent: *Apr. 5, 2022

(54) IRRIGATION SYSTEM AND METHOD

(71) Applicant: Wayne LeBaron, Cedar City, UT (US)

(72) Inventor: Wayne LeBaron, Cedar City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,971

(22) Filed: Jan. 29, 2021

(65) Prior Publication Data

US 2021/0235640 A1   Aug. 5, 2021

Related U.S. Application Data

(60) Provisional application No. 62/968,146, filed on Jan. 30, 2020.

(51) Int. Cl.
| | | |
|---|---|---|
| *A01G 25/09* | (2006.01) | |
| *B05B 15/652* | (2018.01) | |
| *B05B 13/00* | (2006.01) | |
| *B05B 1/20* | (2006.01) | |

(52) U.S. Cl.
CPC ........... *A01G 25/09* (2013.01); *A01G 25/092* (2013.01); *A01G 25/097* (2013.01); *B05B 1/20* (2013.01); *B05B 13/005* (2013.01); *B05B 15/652* (2018.02)

(58) Field of Classification Search
CPC ......... B05B 15/562; B05B 1/20; B05B 1/185; B05B 13/005; B05B 12/124; A01G 25/09; A01G 25/16; A01G 25/092; A01G 25/097
USPC ......... 239/69, 726, 727, 728, 734, 740, 742, 239/575
See application file for complete search history.

(56) References Cited

U.S. PATENT DOCUMENTS

| | | | |
|---|---|---|---|
| 2,743,133 A | 4/1956 | Badders | |
| 4,411,386 A | 10/1983 | Disbrow | |
| 4,491,274 A | 1/1985 | Noble | |
| 4,949,656 A | 8/1990 | Lyle et al. | |
| 5,348,226 A | 9/1994 | Heiniger et al. | |
| 5,390,858 A | 2/1995 | Watson | |
| 5,678,771 A * | 10/1997 | Chapman | A01G 25/092 239/727 |

(Continued)

FOREIGN PATENT DOCUMENTS

CN          105191754 A       12/2015

OTHER PUBLICATIONS

Zhang et al.; "The Influence of Sinusoidal Oscillating Water Flow on Sprinkler and Impact Kinetic Energy Intensities of Laterally-Moving Sprinkler Irrigation Systems." Water 2019, 11, 1325; Published Jun. 27, 2019; 16 Pages.

*Primary Examiner* — Steven J Ganey
(74) *Attorney, Agent, or Firm* — Thorpe North & Western, LLP

(57) ABSTRACT

An agricultural irrigation system and method for irrigating a field includes a water supply pipe supported by a wheeled support or tower. The irrigation system can move in an oscillating fashion across the field while dispersing water. The irrigation system is advanced in a forward direction a first distance, reversed in a backward direction a second distance that is less than the first distance, then readvanced in a forward direction. The system can include a manifold connected to the water supply pipe. The manifold includes drop lines to supply water to a crop below the manifolds. Existing irrigation systems can be retrofitted with the manifold and drop lines.

17 Claims, 6 Drawing Sheets

(56) References Cited

U.S. PATENT DOCUMENTS

| | | | | |
|---|---|---|---|---|
| 5,779,163 | A | 7/1998 | Gunter | |
| 8,210,445 | B2 | 7/2012 | Coleman et al. | |
| 8,550,383 | B2 * | 10/2013 | McConnell | A01G 25/09 239/726 |
| 8,849,467 | B2 * | 9/2014 | Korus | A01G 25/16 239/723 |
| 2009/0294341 | A1 * | 12/2009 | Beer | B05B 15/40 210/111 |
| 2017/0359975 | A1 | 12/2017 | Reuter | |
| 2019/0021244 | A1 * | 1/2019 | Anderson | A01G 25/092 |

* cited by examiner

IRRIGATION SYSTEM AND METHOD

PRIORITY CLAIM(S) AND/OR RELATED APPLICATION(S)

Priority is claimed to U.S. Provisional Patent Application Ser. No. 62/968,146, filed Jan. 30, 2020, which is hereby incorporated herein by reference.

This is related to U.S. patent application Ser. No. 17/144,509, filed Jan. 8, 2021, which is hereby incorporated herein by reference.

FIELD OF THE TECHNOLOGY

The present technology relates to systems and method for agricultural irrigation, and particularly for irrigation of large fields of crops.

BACKGROUND OF THE TECHNOLOGY AND RELATED ART

Agricultural irrigation systems are used to water to crops. Water is supplied to an irrigation device, which distributes the water to the crops. Common irrigation devices include center pivots and wheel lines. As water resources become increasingly scarce, there remains a need for improved irrigation methods and devices.

BRIEF DESCRIPTION OF THE DRAWINGS

The present technology will become more fully apparent from the following description and appended claims, taken in conjunction with the accompanying drawings. Understanding that these drawings merely depict exemplary aspects of the present technology, they are therefore not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

DETAILED DESCRIPTION

Figure 1:
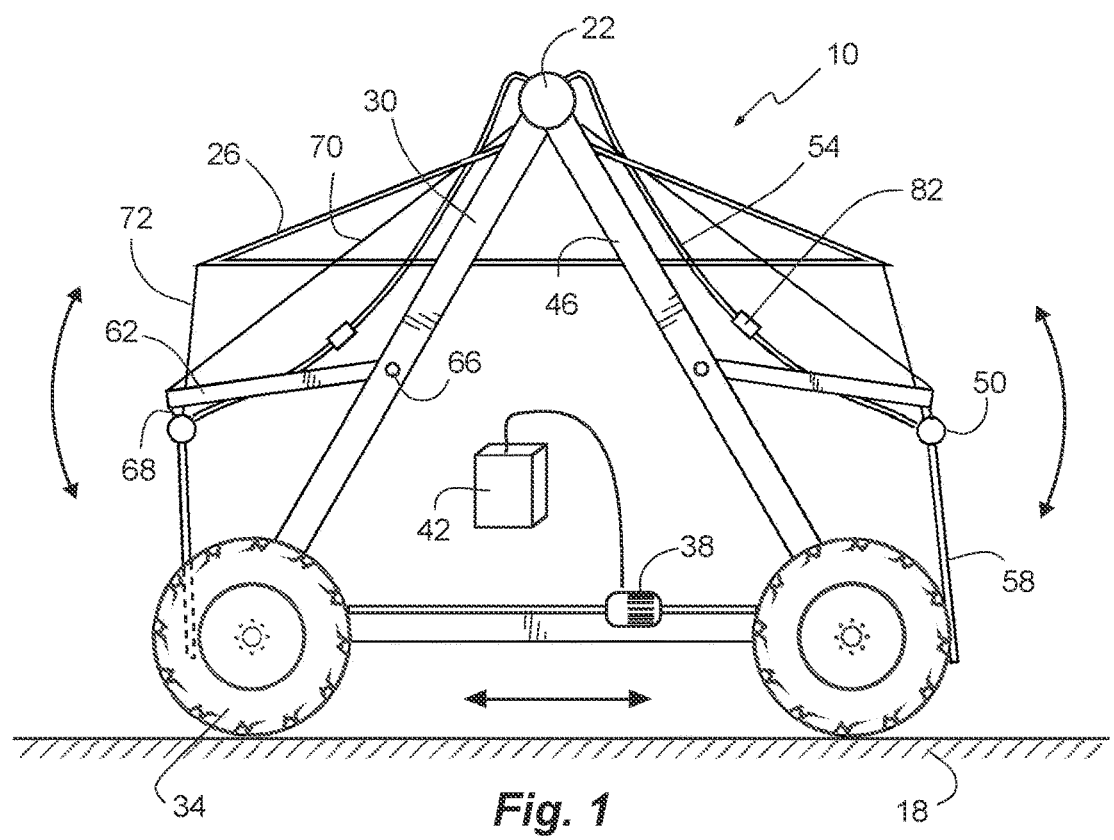
FIG. 1 is a side view of an agricultural irrigation system according to one aspect of the present technology.

The following detailed description of exemplary aspects of the technology makes reference to the accompanying drawings, which form a part hereof and in which are shown, by way of illustration, exemplary aspects in which the technology may be practiced. While these exemplary aspects are described in sufficient detail to enable those skilled in the art to practice the technology, it should be understood that other aspects may be realized and that various changes to the technology may be made without departing from the spirit and scope of the present technology. Thus, the following more detailed description of the aspects of the present technology is not intended to limit the scope of the technology, as claimed, but is presented for purposes of illustration only and not limitation to describe the features and characteristics of the present technology and to sufficiently enable one skilled in the art to practice the technology. Accordingly, the scope of the present technology is to be defined solely by the appended claims.

The following detailed description and exemplary aspects of the technology will be best understood by reference to the accompanying drawings, wherein the elements and features of the technology are designated by numerals throughout.

The present technology includes agricultural irrigation systems and methods. The system can be provided as a new system, or it can be retrofitted on existing irrigation systems, such as pivot systems and linear or wheel line systems. The systems and methods of the present technology can overcome the disadvantages of existing systems as discussed more herein. In particular, the systems and methods of the present technology can lower water usage while still providing sufficient water for irrigation purposes. Specifically, the systems and methods of the present technology can help eliminate flooding and other inefficiencies while irrigating fields.

Water is usually a limited resource in areas where crops are irrigated. When irrigating, the potential for evaporation is high, creating a major need for water conservation. Currently a vast amount of irrigated crop ground is watered with center pivots or wheel lines (also known as side roll, roll line, wheel move, or motoroll) using pressure sprinklers. Currently a significant amount of the water that leaves the sprinklers never reaches the ground and is being lost to evaporation.

There are various reasons for this water loss. For example, the extensive surface area of the many droplets of water is exposed to the air, which facilitates evaporation and increases with surface area, wind speed, temperature and lower relative humidity. Moreover, the ongoing application of water on the surface area of the crop within the footprint of application facilitates evaporation of water which increases with the same variables outlined above. After the pivot or wheel line moves on there is a residual amount of water retained on the extensive surface area of the crop that stays on the plants until it is lost to evaporation.

A significant amount of water that does reach the ground is being wasted because evaporative loss and/or high-volume application of water. Evaporative loss can be due to water being applied to the entire surface of the field when bare or during short crops, and its exposure to air and sunlight. Losses increase with temperature, wind speed and lower relative humidity. High-volume application of water on a limited area or footprint exceeds its capacity to soak in and floods to other areas. This creates areas of the field being compromised by lack of water and other areas being over watered and possibly damaged and water being wasted.

There are various efforts underway to save water in irrigation concepts. For example, technologies that are available to help pivots overcome water losses include: Dragon-Line® and Lowe Energy Precision Application (LEPA). Dragon-Line® uses many dripper-like lines that drag on the ground behind a pivot. The lines can be problematic. LEPA systems use more applicators that are closer to the crop and dribble or spray water over a small area. This reduces some of the water loss but also reduces the application footprint and vastly increases the potential for flooding even on flatter fields with better soils. Hanging long hoses make them highly susceptible to be blown around by the wind, increasing water loss. The LEPA systems can have limited water savings; and plugging and flooding can be an issue. Despite some advances, deficiencies still remain and there is room for improving the use of water in irrigation system and methods.

The irrigation systems and methods of the present technology has the potential to:
 Nearly eliminate irrigation evaporation loss from sprinkling, as outlined above, with almost 100% of the water reaching the ground.
 Create an adjustable and potentially vast effective water application footprint to help overcome flooding from clay soils and sloping fields, thus adequately irrigating fields more evenly, using less water.
 Reduce evaporation water loss from bare ground and during limited growth stages of crop by direct application to only a portion of the ground with subsequent soaking in of the water.
 Reduce the water volume, pumping rate and pressure necessary to be able to evenly and adequately irrigate a field, creating lower equipment and energy costs.
 Adjust for the height of a crop making it convenient to do crop rotations between short crops like alfalfa and tall crops like corn, while at the same time being able to revert to the original water application method of hanging sprinklers, with little effort and time.

The above is accomplished along with a reduced propensity for excessive wear or line breakage or crop damage or plugging of orifices, as compared to Dragon-Line® and an increased range of motion of the pivot. The above is accomplished along with a reduced propensity for plugging of flow-controlled nozzles and reduced susceptibility of emitters being blown around by the wind, as compared to LEPA systems.

Figure 2:
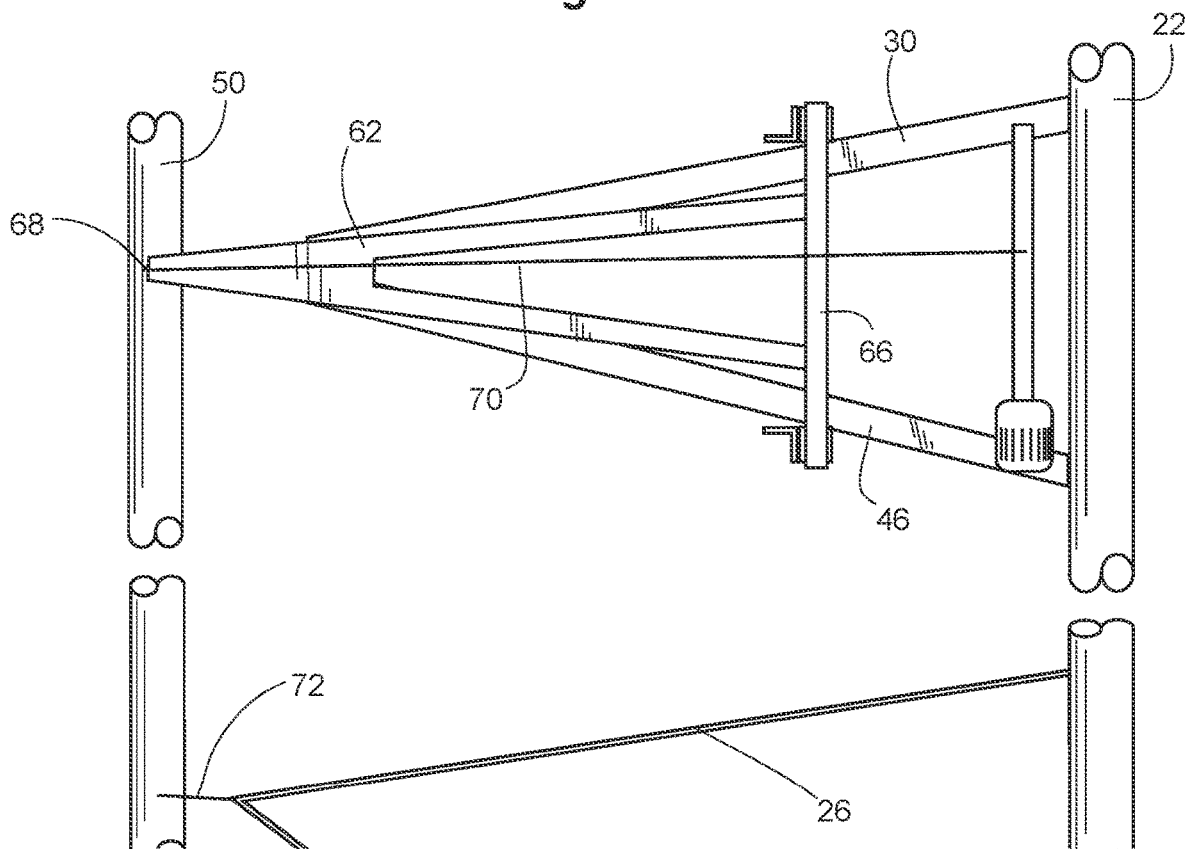
FIG. 2 is a top view of a brace of the irrigation system of FIG. 1.
Figure 3:
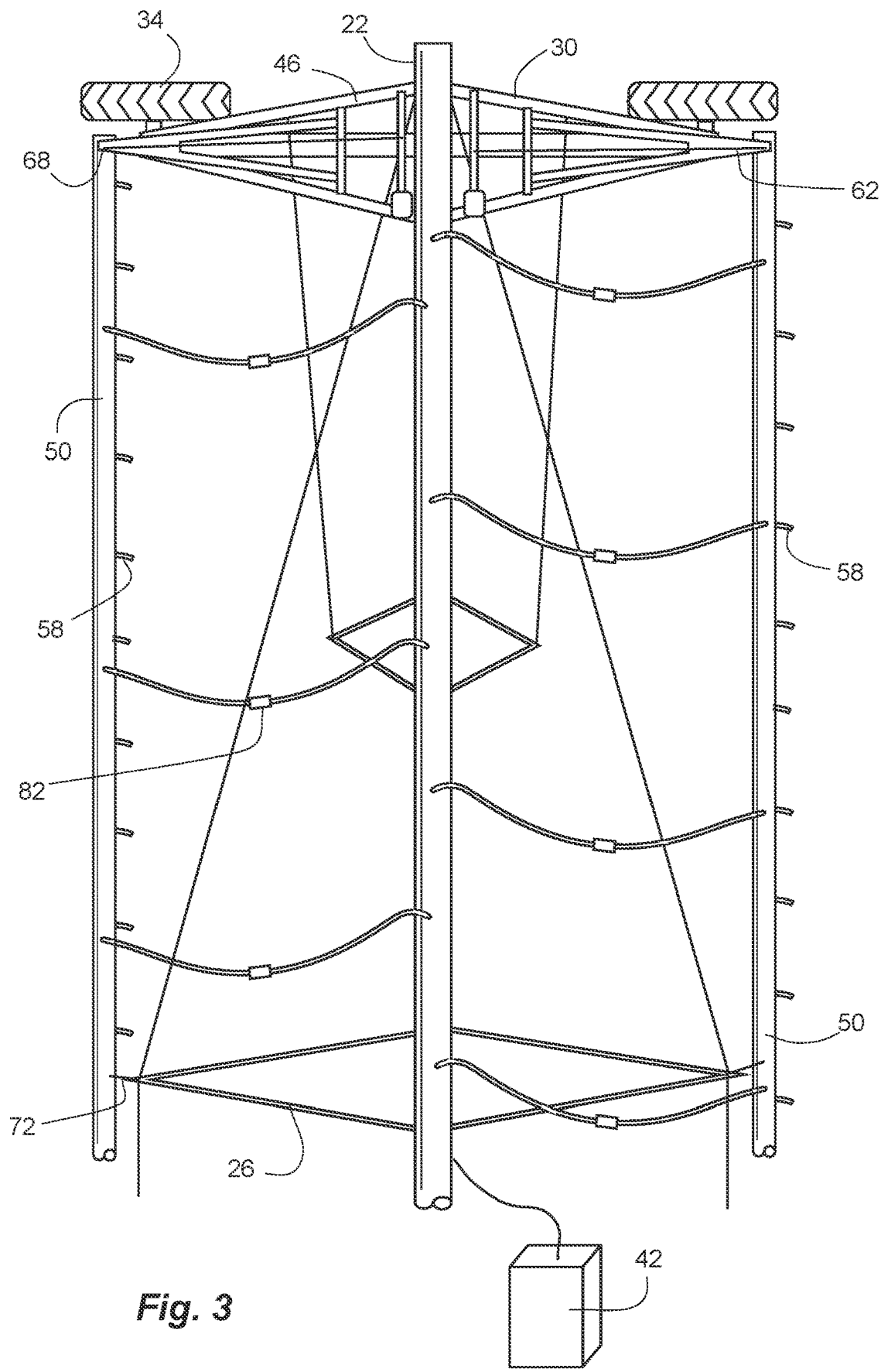
FIG. 3 is a top view of the irrigation system of FIG. 1.

Referring to FIGS. 1-3, an irrigation system 10 in accordance with aspects of the present technology is shown. The system 10 will be described with respect to a center pivot type system with the understanding that such description is also applicable to other pivot, lateral or linear, wheel line, etc., type systems. The system 10 can be coupled to a water source 14 (FIG. 6) that can be pressurized. The system 10 can move or displace, rotationally or linearly, across a field 18 (FIGS. 6 and 7) that can be circular or rectangular. The system 10 dispenses water from the water source 14 to the field 18 and plants associated with the field.

The system 10 can have a water supply pipe 22 coupled to the water source 14. In one aspect, the water supply pipe 22 can be elevated above the field 18 and the ground, and it can be oriented substantially horizontally. In another aspect, the water supply pipe 22 can form part of the structure and trusses of the system 10 along with cables, beams or truss rods 26. Thus, the water supply pipe 22 can form arcs. The system 10 can also have a wheeled support, such as a wheeled tower 30. The wheeled support or tower 30 can carry the water supply pipe 22 in the elevated position and horizontal orientation. The wheeled support or tower 30 can have wheels 34 that can move on the ground and the field 18. The wheels 34 can be coupled to and driven by a driver 38, such as an electric motor. The driver 38 and the wheels 34 can displace the wheeled support or tower 30 and the water supply pipe 22. Movement of the wheels 34, and thus the system 10, can be controlled by a controller 42 (shown schematically in FIGS. 1 and 3). A vertical frame 46 can extend from the wheels 34 to the water supply pipe 22, and can form a portion of the structure of the system along with the cables and beams 26. In one aspect, the system 10 can comprise an array of wheeled supports and towers 30 spaced-apart from one another and extending from a proximal end of the system at the water source 14 to a distal end away from the water source 14. The water supply pipe 22 can be suspended between the wheeled supports or towers 30.

The system 10 can also comprise a manifold 50 carried by the wheeled support or tower 30. In one aspect, the manifold 50 can be raised and lowered with respect to the structure of the system 10, the water supply pipe 22, the wheeled supports or towers 30, and thus the field 18 and the ground. In another aspect, the manifold 50 can be a pipe elevated above the field 18 and the ground, and oriented substantially horizontally. In one aspect, the manifold 50 can be elongated and can extend substantially a length of the system 10 and the water supply pipe 22. In another aspect, the manifold 50 can be substantially parallel with the water supply pipe 22. In one aspect, a pair of manifolds 50 can disposed on opposite sides of the water supply pipe 22, as shown in FIGS. 1 and 3. In another aspect, a single manifold 50 can be located between adjacent wheeled supports or towers 30. In another aspect, three or more manifolds 50 can be suspended between a pair of adjacent wheeled supports or towers 30, depending on particular water supply needs. In another aspect, both the water supply pipe 22 and the manifold(s) 50 can be segmented, with segments located between adjacent wheeled supports or towers 30, and/or with adjacent segments being articulated with respect to one another.

A water line 54 can be fluidly coupled to and between the water supply pipe 22 and the manifold 50 to supply water. In one aspect, multiple water lines 54 can be arrayed along the water supply pipe 22 and the manifold 50. In another aspect, the water lines 54 can be flexible and each can comprise a hose to accommodate movement of the manifold 50 with respect to the water supply pipe 22. In one aspect, the water lines 54 may be existing, and may have a sprinkler installed at the end, which may be removed when an irrigation system is retrofitted to include the aspects of the technology discussed herein.

The system 10 can also comprise drop lines 58 pendant from the manifold 50 and fluidly coupled to the manifold 50 to disperse water on the field 18 and the ground. In one aspect, the drop lines 58 can comprise tubes. In another aspect, the drop lines 58 can extend substantially vertically from the manifold 50 to a location close to but above the field 18 and the ground. The drop lines 58 can be flexible and resilient, such as elastic. The drop lines 58 can be more flexible than the water supply pipe 22 and the manifold 50 to avoid damaging crops, but stiff enough to resist displacement by the wind. The drop lines 58 can be raised and lowered along with the manifold 50 to accommodate different crops and/or watering conditions. The drop lines 58 can be or can comprise a nozzle, that can be sized to provide the correct amount of water to the crops. In one aspect, the drop lines 58 can be spaced-apart to accommodate the crop spacing. In another aspect, the drop lines 58 extending from one manifold 50 can be offset with respect to drop lines 58 of the other manifold 50.

The system 10 can also comprise a brace 62 pivotally coupled to the wheeled support and tower 30 and carrying the manifold 50. The brace 62 can have a proximal end pivotally coupled to the vertical frame 46 of the wheeled support or tower 30 at a hinge or axle 66. The manifold 50 can be carried by and suspended from a distal free end of the brace 62. In one aspect, the manifold 50 can be suspended from the brace 62, such as by a cable 68 extending between and secured to the brace 62 and the manifold 50. The brace 62 can be pivotal to selectively and vertically raise and lower the manifold 50, and thus the drop lines 58. In one aspect, a cable 70 can be coupled to the distal free end of the brace 62 and the vertical frame 46 of the wheeled support or tower 30 to support the manifold 50 and the brace 62. In one aspect, the manifold 50 can be suspended by the cable 70 coupled to the brace 62. A motor can be used to raise and lower the brace 62. In one aspect, multiple braces 62 can be coupled to the multiple wheeled supports or towers 30. In one aspect, the wheeled supports or towers 30 can be spaced-apart far enough (e.g. about 180 feet) that the manifold 50 can also be suspended from the truss rods 26, such as by cable 72 extending between and secured to the truss rods 26 and the manifold 50. In one aspect, there can be 5 to 7 points of suspension from the truss rods 26. In one aspect, the cables 68 and the cables 72 can be separate from one another. In another aspect, cable 68 and cables 72 can be a single cable coupled to a single manifold 50.

Figure 4:
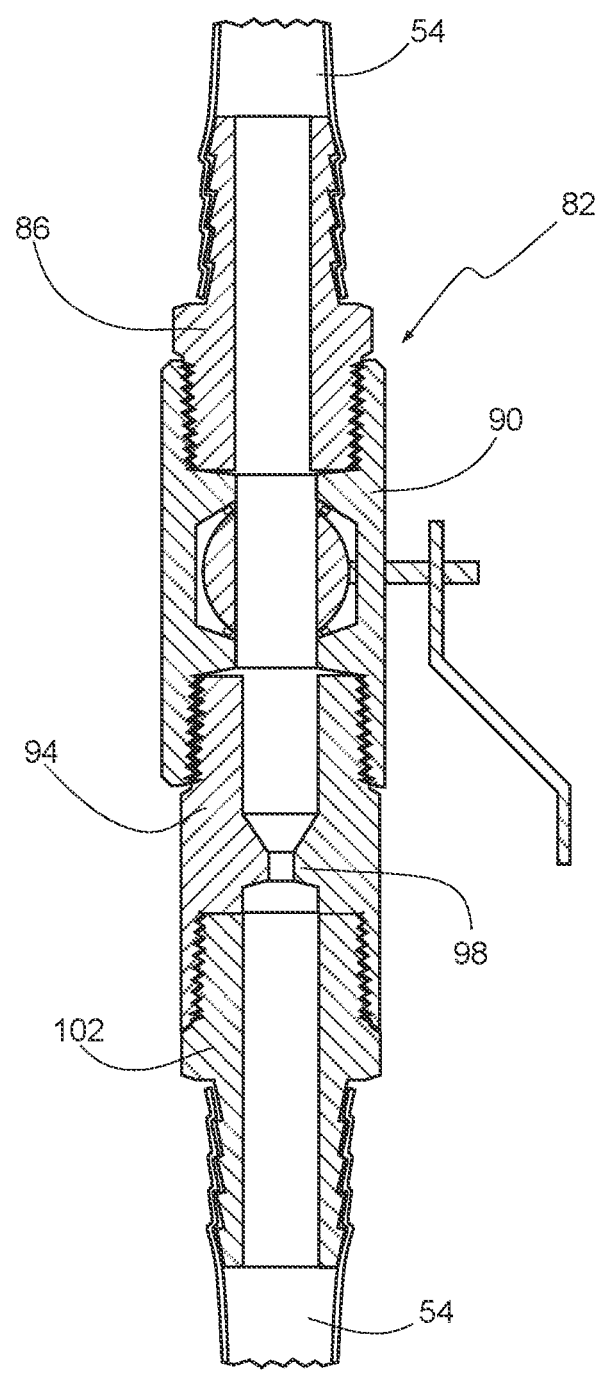
FIG. 4 is a cross-sectional side view of a fitting in a supply line from a water supply pipe to a manifold of the irrigation system of FIG. 1 according to one aspect of the present technology.

Referring to FIG. 4, the water supply line 54 can comprise a fitting 82 disposed in-line between the water supply pipe 22 and the manifold 50. The fitting 82 can comprise at least one component to control or affect the water flow. In one aspect, the fitting 82 can comprise a male hose to male pipe thread adapter 86 and a clamp to attach to the water supply line 54. In another aspect, the fitting 82 can comprise a valve 90, such as a ball valve, to control the flow of the water, or even turn off the water in the water supply line 54. In another aspect, the fitting 82 can comprise a pressure regulator 94. In another aspect, the fitting 82 can comprise a flow control orifice 98 with a reduced diameter. In another aspect, the fitting 82 can comprise a female swivel to male hose adaptor 102 and a clamp. In another aspect, the fitting 82 can comprise an air inlet orifice to reduce suction. In another aspect, the fitting 82 can comprise combinations of the above.

Figure 5:
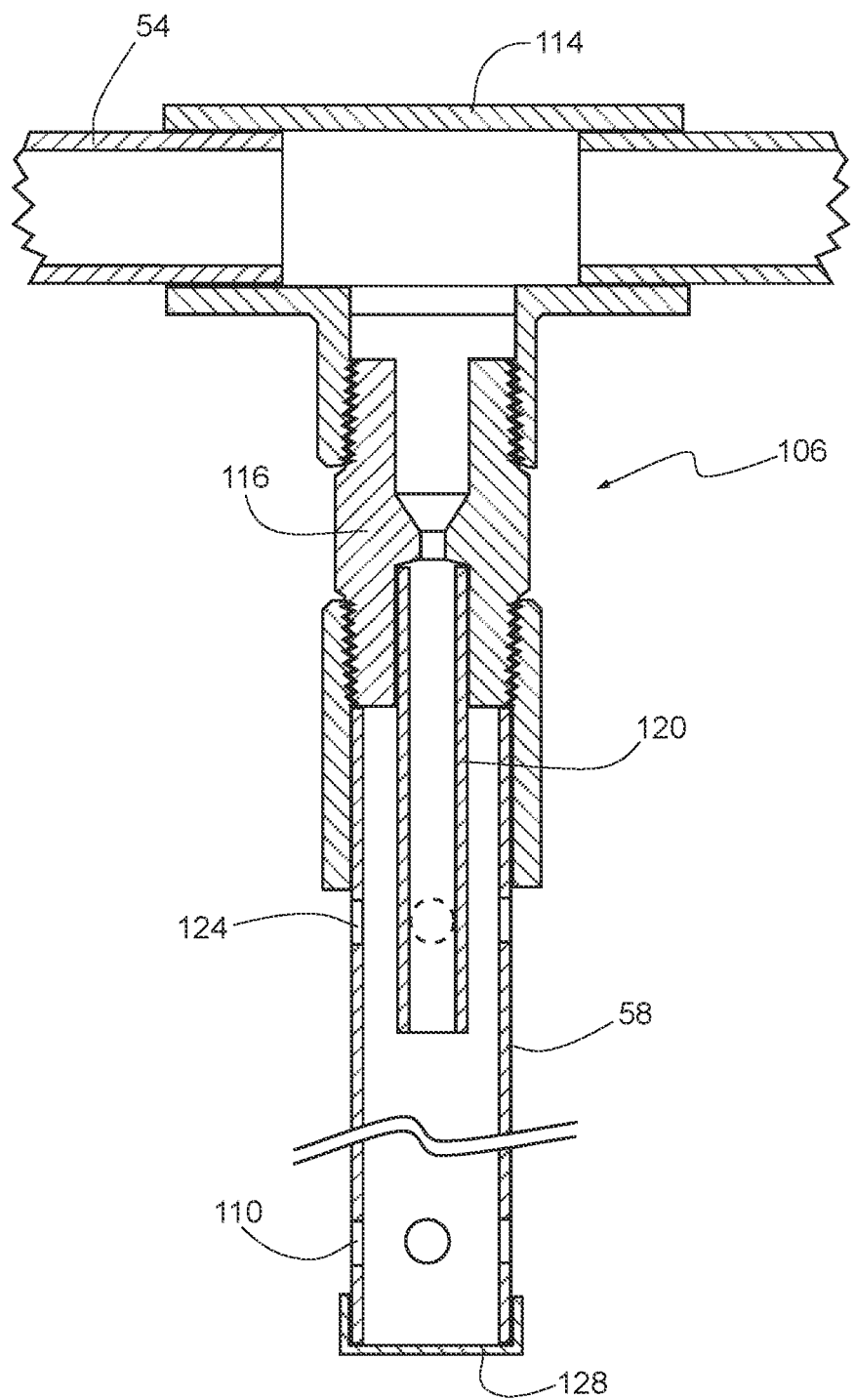
FIG. 5 is a cross-sectional side view of the manifold and drop line of the irrigation system of FIG. 1 according to one aspect of the present technology.

Referring to FIG. 5, the manifold 50 and/or the drop lines 58 can comprise fittings 106 disposed in-line between the manifold 50 and an outlet 110 of the drop lines 58. The fittings 106 can comprise at least one component to control or affect the water flow. In one aspect, a T-fitting 114 can be between the manifold 50 and the drop line 58. In another aspect, the drop lines 58 can comprise a flow control orifice 116 with a reduced diameter. In another aspect, the drop lines 58 can comprise a capillary tube 120. In another aspect, the drop lines 58 can comprise an air inlet orifice 124. The air inlet orifice 124 can extend through the lateral wall of the tube of the drop line 58 above the outlet 110 of the drop line 58 and adjacent to the capillary tube. The air inlet orifice 124 can reduce suction. Prior to the air inlet orifice 124, an orifice 116 can be provided that creates the pressure drop for the air inlet orifice 124 to allow air to flow in rather than allow water to travel out. In another aspect, the drop lines 58 can comprise a closure 128, such as a cap, a plug or a crimp. In another aspect, the drop lines 58 can comprise combinations of the above. In one aspect, the outlet 110 and/or the drop lines 58 can define water nozzles for dispersing water.

Figure 6:
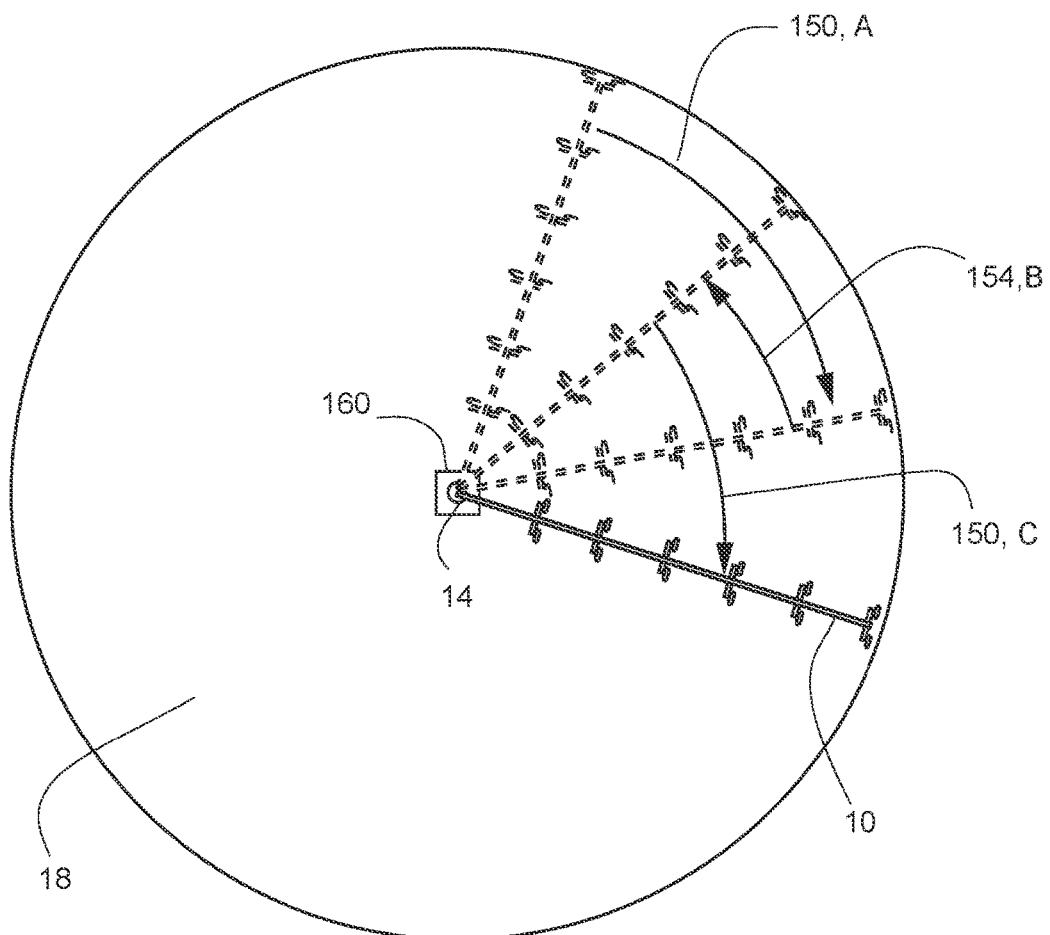
FIG. 6 is a schematic top view of a method of irrigating a circular field with a center pivot agricultural irrigation system according to one aspect of the present technology.
Figure 7:
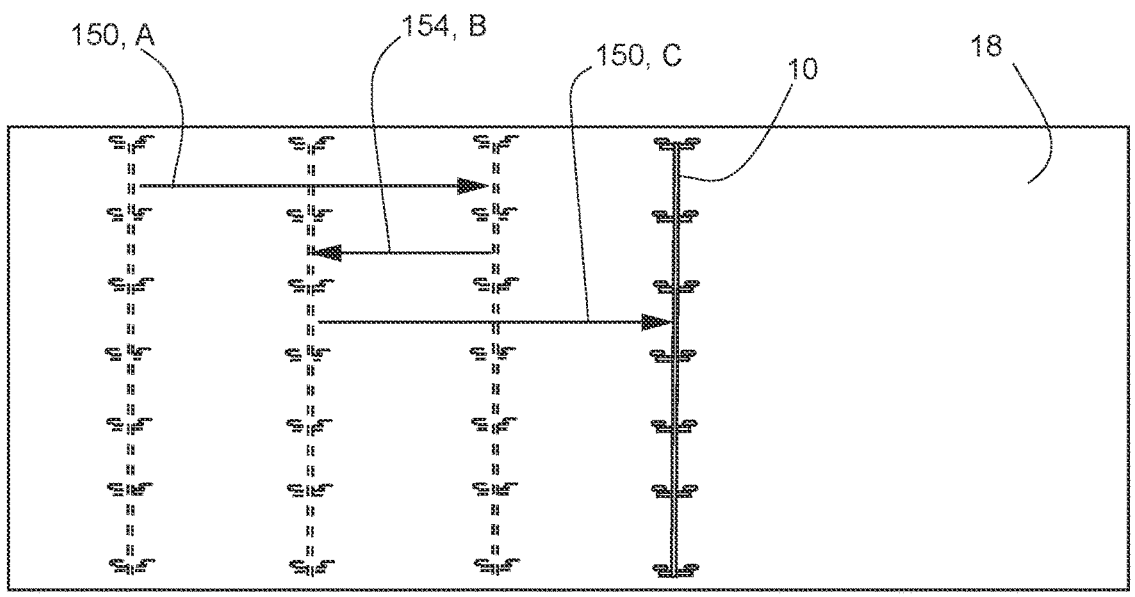
FIG. 7 is a schematic top view of a method of irrigating a rectangular field with a linear or wheel line agricultural irrigation system according to one aspect of the present technology.

As described above, the driver 38 can drive the wheels 34 to displace the wheeled support or tower 30 and the water supply pipe 22. In one aspect, the system 10 can reciprocate while dispersing water, and the wheeled support or tower 30 and the water supply pipe 22 can be driven back and forth by the driver 38, the wheels 34 and the controller 42. Referring to FIGS. 6 and 7, a method of using the system 10 and for irrigating the field 18 are shown, while FIG. 6 representing a circular field and the system configured for a center pivot type system, and FIG. 7 representing a rectangular field and the system configured for a lateral or wheel line type system. The controller 42 can be programed so that the driver 38 and the wheels 34 are:

advancing the wheeled support or tower 30 in a forward direction 150 across the field 18 for a first forward distance A, and/or first forward time interval, while water is dispersed through the drop lines 58;

reversing or retreating the wheeled support or tower 30 in a backward or reverse direction 154 for a second reverse distance B, and/or a second reverse time interval, that is less than the first forward distance A, while water is dispersed through the drop lines 58; and readvancing the wheeled support or tower 30 in the forward direction 150 a third forward distance C that is greater than the second reverse distance B while water is dispersed through the drop lines 58.

In one aspect, the system 10 can travel at a faster speed while traversing back and forth across sections of the field 18 than a slower speed typically used to traverse the field a second time. Thus, flooding and evaporation can be avoided by allowing water to soak into the ground. In addition, sections of the field 18 are defined that are traversed three times in two directions. Thus, the system 10 can varying oscillating movements to keep the water from flooding while still apply sufficient volume of water.

The method or irrigating the field 18 can comprise:

causing the system 10 to advance in a forward direction 150 across the field 18 for a first forward distance A in one aspect while dispersing water through the water nozzles 58;

causing the system 10 to reverse in a backward direction 154 for a second reverse distance B that is less than the first forward distance A (in one aspect while dispersing water through the water nozzles 58); and causing the system 10 to readvance in the forward direction 150 a third forward distance C that is greater than the second reverse distance B while dispersing water through the water nozzles 58.

In one aspect, the system 10 can disperse water periodically while oscillating or reciprocating. For example, the system 10 can disperse water while advancing and readvancing in the forward direction 150. In another aspect, the system can disperse water also while reversing in the backward direction 154. In another aspect, the system 10 can disperse water continuously.

The method can further comprise causing the system 10 to repeatedly reverse and readvance while dispersing water through the water nozzles 58 until a predetermined stop location is reached away from a start location of the system, and after the system has traversed the field 18. Causing the system 10 to advance, reverse, and readvance can be accomplished with the wheels 34, the driver 38 and the controller 42. In one aspect, causing the system 10 to advance, reverse, and readvance can be accomplished by programming and/or operating the controller 42. For example, the controller 42 can be programed to cause the advancement, reversal, and readvancement while watering.

Referring to FIG. 6, the system 10 can comprise a pivot irrigation system with a hub 160, a water supply pipe 22 extending therefrom, a wheeled tower 30 carrying the water supply pipe 22, and the water pipe 22 and the wheeled tower 30 pivoting about the hub 160. Causing the system to advance, reverse and readvance can further comprise:

causing the system 10 to advance in a forward arcuate direction 150 for a first forward angle;

causing the system 10 to reverse in a backward arcuate direction 154 for a second reverse angle that is less than the first forward angle; and causing the system 10 to readvance in the forward arcuate direction 150 for a third forward angle that is greater than the second reverse angle.

Referring to FIG. 7, the system 10 can comprise a linear or lateral irrigation system with a pair of wheeled towers 30 or wheels, a water supply pipe 22 carried by and extending between the pair of wheeled towers 30 or wheels, and the water supply pipe 22 and the pair of wheeled towers 30 or wheels being displaceable substantially linearly or laterally. Causing the system to advance, reverse and readvance can further comprise:

causing the system 10 to advance linearly in the forward direction 150;

causing the system 10 to reverse linearly in the backward direction 154; and causing the system 10 to readvance linearly in the forward direction 150.

The method can further comprise selectively raising or lowering the manifold 50 and thus the drop lines 58. In one aspect, selectively raising or lowering the manifold 50 and thus the drop lines 58 can further comprise pivoting the brace 62. In one aspect, the controller 42 can also be coupled to the motor associated with the brace 62, and the controller 42 can be programed to raise and lower the brace 62, and thus the manifold 50 and the drop lines 58. For example, the elevation of the manifold 50 can be programmed to change when the system 10 is at a certain position. In one aspect, one of the manifolds 50 can be at a position that is a first height off of the ground, and another of the manifolds 50 can be at a position that is a second, different height off of the ground. In yet other examples, the position can be manually adjustable, either electronically or mechanically.

The controller 42 can be programmed to advance forward a first distance A, reverse a second distance B that is less than the first distance A, and then advance again the first distance A. In other aspects, the controller can be programmed to advance forward a first distance A, reverse a second distance B that is less than the first distance A, then advance a third distance C, which may be equal to the first distance A, or may be greater than or less than the first distance A. This pattern can be repeated, creating an oscillating movement of the irrigation system 10. The controller 42 can be programed with any pattern whereby the irrigation system 10 can apply water to a crop at a high rate of speed to avoid over saturation, flooding, and run-off, but may also return within a short period of time once the initial application has been absorbed to apply additional water.

In one aspect, a distance A, B and C of the oscillation of the irrigation system 10 can be measured by the radial position of the irrigation system 10 at the hub 160. For example, the irrigation system 10 can include a mechanical sensor at the hub 160 that can provide the radial position, for example a degree between 1 and 360, including to the tenth of a degree. In other embodiments, a GPS position of one or more towers 30 of the irrigation system, including a pivot or a wheel line system, can be used to determine the position and measure the oscillation. In yet other embodiments, a time which the irrigation system 10 is advanced in a forward direction can also be used to measure the pattern of oscillation. For example, an irrigation system 10 can be advanced forward at a given rate of speed for a number of minutes x, then may be reversed backward a number of minutes y, which may be less than x. The irrigation system 10 then can be advanced forward again for a number of minutes z, which may be the same as x, or may be less or more.

In aspects of the present technology, the irrigation system 10 can be programmed to move in accordance with its normal operation. For example, a center pivot can include a motor or series of motors to move the center pivot in a positive radial direction or in a negative radial direction, or in other words forward or backward. As another example, a wheel line can include a motor to move the wheel line by spinning one or more of the wheels. Thus, the irrigation system 10 can move in a forward and backward direction.

The movement of the irrigation system 10 can be programmed in the controller 42, In other words, the first distance A and the second distance B may be set in a program that runs the movement of the irrigation system 10. The program can be run from a control box at the irrigation device, or remotely from a computer, tablet smartphone or other device. The program may include multiple sensors, such as sensors throughout the field to be irrigated that relay the moisture level of the soil to the controller 42. Thus, the controller 42 can automatically change the speed of travel of the irrigation system 10 and/or the travel distance A or B to increase or decrease the moisture levels at certain areas of the field to be irrigated. In some aspects, the controller 42 can be programmed to apply water on portions of the field to be irrigated at different rates than on anther portion of the field. For example, for one half of the field, the irrigation system 10 may move at one speed and with certain first and second distances A and B. However, for the other half of the field, the system 10 can move at a different speed, and with different first and second distances. Thus, the system 10 can be highly adaptable for various crops, and various soil, and various weather conditions.

Figure 8:
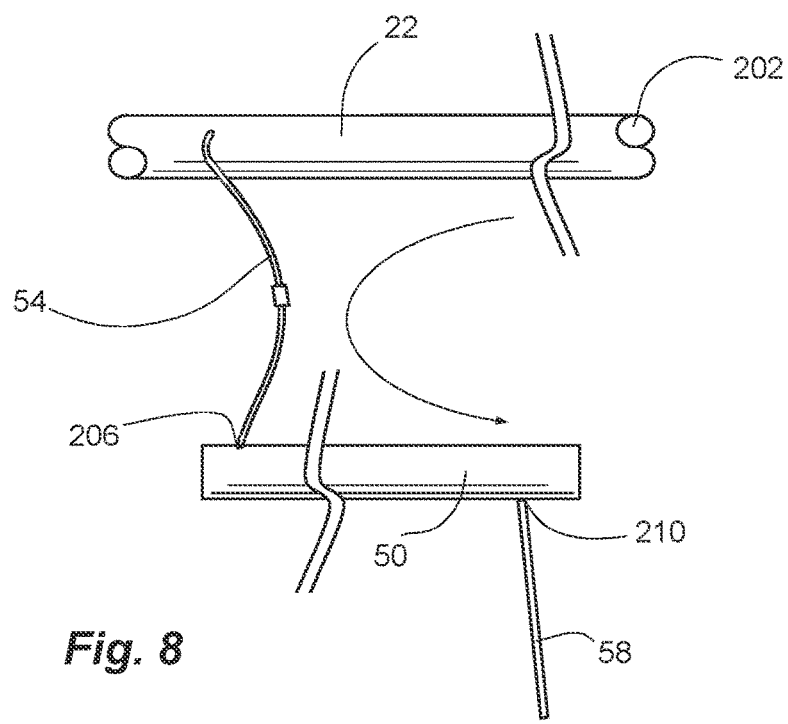
FIG. 8 is a side schematic view of another agricultural irrigation system according to another aspect of the present technology.
Figure 9:
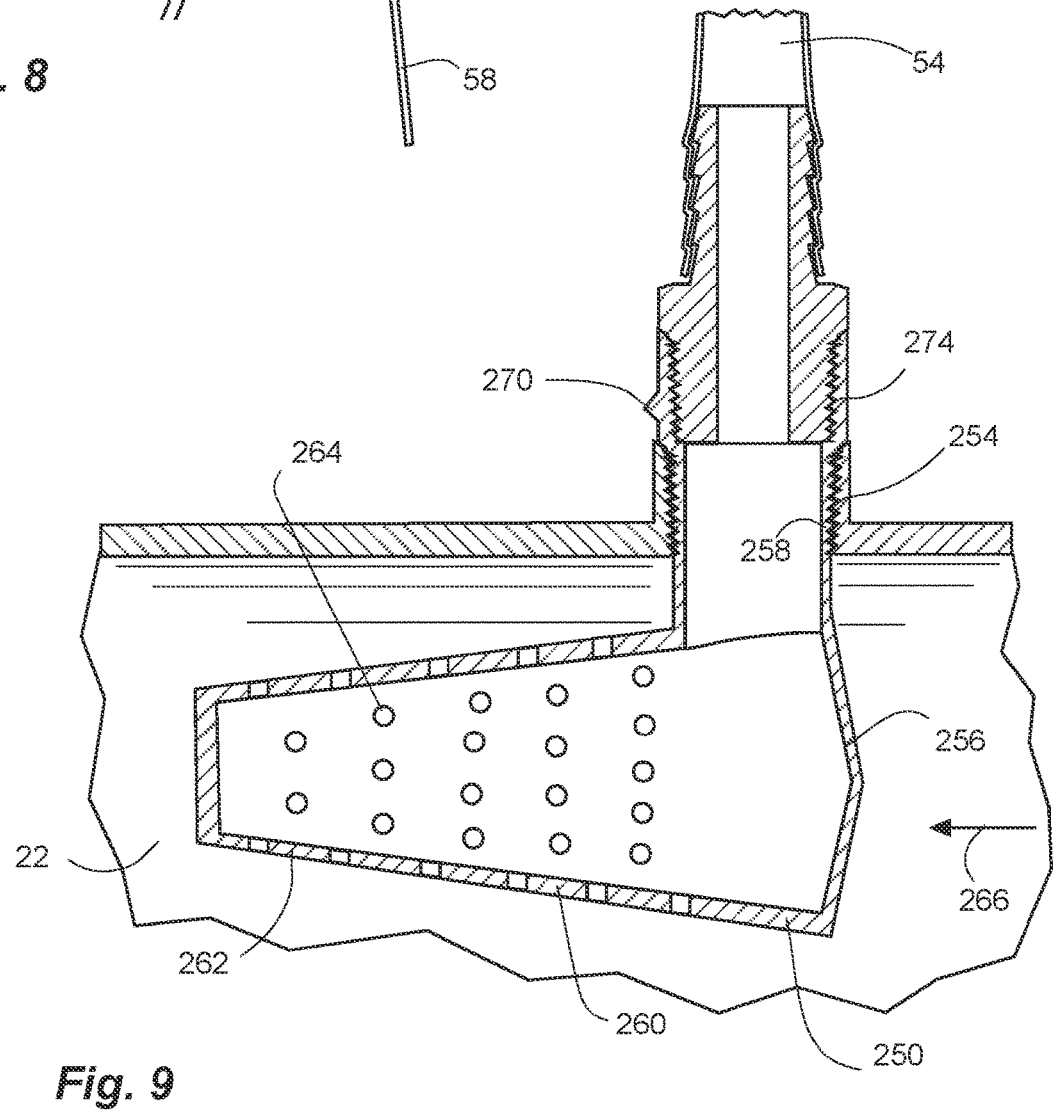
FIG. 9 is a side cross-sectional schematic view of a filter according to one aspect of the present technology.

In traditional irrigation systems, high pressure is at the center near the hub and water source, where the smallest irrigation footprint is, thereby requiring the lowest volume of water, so small nozzles are used to lay down small amounts of water. By contrast, the lowest pressure is out at the distal end, where the largest footprint of water is needed, so the largest nozzles are used. Referring to FIG. 8, in one aspect, the water supply pipe 22 and the manifold 50 can be configured to redirect water back in a direction towards a supply inlet 202 of the water supply pipe 22. Thus, switching location of the greater and lower water pressure. The manifold 50 can have a manifold inlet 206 coupled to the water supply pipe 22 farther from the supply inlet 202. In addition, the manifold 50 can have a manifold outlet 210 located closer to the supply inlet 202. Thus, the outlet 210 is located closer to the inlet 202, rather than farther. In this way, the water flows back toward the hub 160, such that higher pressure is farther away from the hub 160 where a larger footprint is needed. In other words, instead of a T-fitting between the water supply hose and the manifold, an elbow can be used to direct water back toward the hub.

In some aspects, the present technology may provide a mechanism for catching debris in the water supply. For example, the small nozzles used at the inner-most point of the pivot irrigation device, where the required volume of irrigation is smallest, but the water pressure is highest pressure, may become clogged due to debris. In some aspects, an L-shaped fitting is provided anywhere between the water supply 14 and the nozzle 58, which fitting may have a filtration screen on the flag part of the fitting. This filtration screen may catch debris large enough to clog the small nozzles, and may be removable to be cleaned out occasionally. In other aspects, a self-cleaning filtration system may be supplied. For example, at the very center of the pivot with the small constriction the velocity of the water within the pipe is very high. The device of the present technology may include a pipe with perforations allowing the high-pressure water to escape downstream. Referring to FIG. 8, the system 10 may further comprise a filter 250 that can be located in the water supply pipe 22, and between the water supply pipe 22 and the water line 54 to the manifold 50. In another aspect, the filter can be located in the manifold 50, and between the manifold 50 and the drop line 58. The filter 250 can have an L-shape and can be inserted through a threaded opening 254 in the water supply pipe 22. (Note that FIG. 8 is not to scale.) One arm 256 of the L-shape can extend vertically, and can be threaded 258 to thread into the threaded opening 254. The other arm 260 of the L-shape can extent substantially horizontally or along the water supply pipe 22. In one aspect, the other arm 260 can be conical and can have a cone 262 with a taper. The other arm 260 can also have multiple holes or perforations 264 extending through the arm 260 and the cone 262 to allow water to enter the filter 250 and then into the water line 54 to the manifold 50. The filter 250 can be oriented so that the other arm 260 and the cone 262 thereof point downstream of the flow, indicated by arrow 266. The cone 262 facing or pointing downstream can allow the passing water to physically carry debris off from the perforations 264 due to friction and pressure. Also, the cone tapering downstream can create eddy currents, suction and/or a Venturi effect of the water to help peel debris off of the perforations 262. Water passing by the cone and the perforations can reduces the pressure difference and allow the particles to break free and move downstream where they can eventually be dispersed through larger nozzles and not cause clogging. The filter 250 can have an indicator 270 located on its exterior outside the water supply pipe 22 to indicate an orientation of the cone, and thus allow proper orientation of the filter 250 when threading into the threaded opening 254 in the water supply pipe 22. The arm 256 can also have a female threaded opening 274 to allow connection to the water line 54. Thus, the filter 250 can be fitted between the water supply pipe 22 and the water line 54.

In aspects of this technology, the irrigation system can include nozzles. The nozzles may be provided at any place between the main line and the exit of the drop line to restrict the flow of water and control the volume of water applied at the specific section of the field. In some aspects, the nozzle may be as depicted in FIG. 4, placed between the main line and manifold. In other aspects, the nozzle may be placed in the manifold. In yet other aspects, the nozzle may be placed at the end of the drop conduits. In some aspects, the nozzles can be off of the shelf, with threads and a splash plate. The system of the present disclosure can include such nozzles at the very bottom with splash plates that put out water radially. These nozzles can come in all sizes, making it convenient to have various sizes for various water flow needs. One advantage of such nozzles is that they are "off the shelf," meaning they may be readily available and at a lower cost than other nozzles. When the nozzle puts water out radially, off of splash plate, the drop conduits can be elevated to cover more ground, for example, when planting fine seed. When planting, it is desirable that a larger area receives and stays covered by water. With nozzles that splash out and cover the entire surface, this consistency for laying seed can be achieved. The same drop conduits and nozzles may also be lowered down after a crop takes root, to save water by applying the water near the ground. It is thus seen that the irrigation methods and devices of the present disclosure are highly adaptable and can be configured for various conditions.

In aspects of the technology, the controller and programable software may be used to track position of the irrigation based on GPS out on the end, instead of mechanical sensors that could not account for slop or play between towers of the pivot irrigation device that are farther from the center of the pivot with the mechanical sensor. The GPS and the controller can communicate with all aspects of the system, including the flow at pumps, electronic control of each nozzle, and can be adjusted for a variety of conditions including clay or sandy soils.

Another method in accordance with the present technology includes retrofitting an irrigation system, including following steps performed in any order: removing one or more sprinklers from one or more water supply hoses connected to the water supply pipe 22; attaching one or more manifolds 50 to the irrigation system; attaching one or more drop lines 58 to the manifolds 50; and connecting the water supply lies 54 to the manifolds 50. The method can also include installing a pivoting brace 62 onto each one of the wheeled supports or towers 30 of the irrigation system, and attaching the manifolds 50 to the pivoting braces 62. In some aspects, the method includes selecting a nozzle with the desired flow rate at each of the drop lines 58, and attaching the nozzle to the end of the drop line 58. The method can also include installing a fitting 82 or 106 between either the water supply line 54 and the manifold 50 or the manifold 50 and the drop line 58, with the fitting including an air inlet.

By way of example, a standard existing irrigation system can be retrofitted to include aspects of the technology discussed herein. For example, a standard center pivot system, such as a seven tower pivot system with drop hoses and sprinklers, using about 1,000 gallons per minute at around 35 psi at the center, can be modified according to the following steps:

1. Disconnect and remove all sprinklers from the drop hoses.

2. Remove the drain plugs and install low pressure drain plugs because the operating pressure will likely be around 15 psi at the center instead of around 35 psi to resist leaking.

3. Create and mount braces 62 onto the A-frames of all the towers 30, in the area above each tire. See FIGS. 1 and 2. The A-frames of towers 1 and 7 may need additional supports, as they will experience one sided pull in contrast to the between towers that will primarily experience downward pull.

4. Run cables along each side of the pivot system from the point of the braces 62 mounted on the A-frames of the first inner tower, all the way to the point of the braces 62 mounted on the A-frames of the outer tower. Then properly tension the cables and then attach them to the points of the braces 62 mounted on the A-frames of the interim towers.

5. A typical tower section of a pivot system usually has triangle shaped braces at intervals along the long arching span that keeps the upper water carrying pipe separated from the lower supporting two truss rods. These lower points, which can be extended outward on each side, if necessary, can be used to attach adjustable hanging supports for the cable or wire below on towers 2 through 7.

6. To the cables running horizontally along each side of the pivot system from the A-frame of the first tower all the way out to the A-frame of the last tower attach a manifold 50 that can have the following characteristics:

a) A diameter sufficient for the volume flow. It could be larger out near the end to reduce friction pressure loss. It could be smaller near the center where less volume is necessary, and restriction may be helpful.

b) Be capable of being simply lowered to a point that is slightly above the shortest crop that would be grown under the pivot.

c) Be capable of being easily raised to a height so as to not obstruct the growth of tall crops such as corn.

d) Have tees into both horizontal water manifolds at intervals with hoses attached thereto that can reach every other corresponding supply hose hanging underneath and from the main center water pipe of towers 2 through 7. These hose connections can be threaded together and could include a valve, pressure regulator and flow control orifice. See FIGS. 3 and 4.

e) Valves at intervals along the horizontal manifold would create the option to potentially irrigate a portion of the field at a given time.

f) Be rust and UV resistant and durable so it can last.

g) Tees at consistent intervals all along each of the lengths that point downward with threads. Connected by threads to this tee is a hose, tube or pipe (water conduit) that may have a flow control orifice at the threaded connection to the horizontal manifold and an optional capillary tube attached to said orifice that is able to be inserted into the descending conduit for improved flow control and reduced risk of plugging. See FIG. 5. The water conduits descend into the crop and carry water from the horizontal manifold lying just above peak crop height and let the water out of holes on each side of its closed end just above ground level. Ideally, this descending conduit should be stiff enough to not move much in the wind, thereby reducing potential crop damage and water loss. Drop conduit should be durable and abrasion resistant. Drop conduits can be exchanged for others either shorter or longer as needed. The horizontal manifold can have some torsion potential allowing individual drop conduits to ride up and over obstacles and dense foliage areas. In consistently dense foliage the entire manifold could hinge slightly, and all of the drop conduits could slope and ride up over some of the foliage. Near the center, where excessive volume flows are a concern, the descending conduits can have holes in them near the top, but below the orifice, to allow air in and reduce suction. The reduced pressure difference from one side of an orifice to the other allows for a larger orifice, for a specific flow rate and thus a reduced propensity for plugging. Typically, the desired flow volume is achieved with current technology by a pressure regulator and/or a single orifice. Placing all the restriction at one point may demand a very small hole which increases the risk of plugging. According to aspects of the present technology, there is the option of a significantly lower operating pressure as there are no sprinklers and without significant evaporation loss and less volume with less restriction or pressure drop to start with. Control of individual application point flow rate by use of:

i. Low operating pressure ii. Pressure regulator iii. Supply hose connection to manifold hose orifice sizing and air inlet iv. Manifold connection to drop conduit orifice sizing v. Use of small diameter water conduits which create capillary flow restriction vi. Drop conduit air inlet ports just below orifice vii. Drop conduits side port discharge orifices sizing near the bottom viii. Filtering debris from the water at any point between the main line and the outlet of the drop conduit.

These options create cumulative restriction allowing for maximum flow control while at the same time greatly increasing the individual orifice or tubing size and significantly reducing the propensity for plugging. The drop line spacing can be created to suit the application. For example, if one is going to plant corn on 30 inch centers and rotate to a future crop of alfalfa, one could use 30 inch spacing between drop conduits or 60 inch and stager one side thereby irrigating between each corn row and the water only needs to soak 15 inches each way to thoroughly irrigate. If one plants corn on 20 inch centers, then create 20 inch spacing or 40 inch and stager one side, then water only needs to soak 10 inches each way. Horizontal manifold can be exchanged for other with different spacing of drops as needed. As indicated earlier the original sprinkler can be temporarily installed to plant fine seed like alfalfa and then be removed or simply be teed into the supply hose with a valve and left on the pivot for even more convenient intermittent use.

8. Optional curved hose at A-frame towers and hanging the horizontal water manifold below the cable allows drop conduits to shift lines to ride between row crops such as corn not consistently spaced.

The extension of the two horizontal manifolds beyond the A-frame of the outer tower of a pivot could be of a more rigid material and with adjustable hanging supports that are closer together if there is not a supporting cable, otherwise they should be in a similar manner as their inner portions.

Under the first tower span there generally are very low water volume application rates as it is near the center, services a very small area and travels very slowly. A single rigid horizontal manifold is sufficient. It can be suspended by the supply hoses at just above crop level. Drop conduits can be spaced at one half the spacing of the outer two manifolds if staggered, otherwise the same. The same points of flow control described above can be used as well. The adjustable hanging supports can be attached to the truss rods, or extensions at closer intervals from one side, or the other, to elevate for higher crops. Another option for raising the manifold is to unhook supply hose from manifold and wrap it around the main water pipe and reconnect the hose to the manifold, then do the same to the rest of the hoses on the first tower span.

In aspects of the technology, the manifold can be configured to raise and lower electrically and/or automatically via a program. In one aspect, the irrigation device may include a wire in a cable winch that, as it rotates, raises and lowers all of the manifolds. In other aspects, a shaft can be suspended with supports along the length of the pivot, with spools at each cable point. A motor attached to the drive shaft at the center can control the raising and lowering of the entire line.

With current operating methods the faster a pivot moves, the percentage of the water that actually reaches the ground gets smaller. For example, if a pivot at high speed lays down one quarter an inch of water on a tall stand of alfalfa less than 10% of the water may actually reach the ground and over 90% may be lost to evaporation. To overcome this massive loss farmers typically slow pivots way down to reduce loss, however, in doing so they significantly increase the risk of flooding and overwatering some areas of the field and underwatering others, which wastes water.

This present technology additionally consists of the technology of adding a control mechanism to the pivot or control panel that creates an adjustable and repeating oscillation movement of the pivot. Controlling an adjustable distance, a pivot moves in one direction compared to a subsequent controlled and adjustable distance moved in the other direction and repeating, determines the number of passes over a given area and the accumulative amount of water applied, as well as the prevailing direction of travel, the overall advancement rate and the size of the effective water application footprint. Thereby, one can easily increase or decrease the size of the effective water application footprint according to their desire to virtually eliminate flooding. This can be further enhanced by speeding up the outer towers, reducing the amount of water applied during a single pass so it can soak in where applied, instead of flooding, by using larger tires, higher gear ratios, larger and faster motors and gear drives, frequency drives or combinations thereof.

Furthermore, aspects of the present technology include methods to create a steady and aligned movement of the pivot in contrast to the incremental starts and stops of towers which create uneven water application. These include start and stop control microswitches subject to increased leverage so as to make them sensitive to smaller changes of angle between pivot towers, larger tires on outer towers and smaller tires on inner towers, varying horsepower and gear ratios between inner and outer towers, hydraulic drive motors with position control valves to control speed and stay aligned and moving, the use of dc motors with supply voltage being regulated by alignment sensors, frequency drives for ac motors that monitor alignment and compensate, the use of pressure sensors that monitor position and quantify deviation, the use of GPS technology to monitor and control, whether used individually or collectively to maintain a steady and aligned movement. The irrigation devices disclosed herein are applicable to irrigation pivots as well as irrigation wheel lines and mobile water applicators, among other irrigation systems.

In one aspect of the technology, the position of each tower in an irrigation system, such as an irrigation pivot, is tracked using GPS. Other aspects of the system, including the flow at the pumps providing water to the irrigation system and the flow at each nozzle releasing water to the crop are also monitored using sensors. The system may include a communication and control module that gathers various information from the GPS locations and flow sensors, then controls various aspects of the system based on that information. For example, each tower may include a drive motor, with the speed increased or decreased based on the GPS location of the tower with relation to the other towers, to maintain an even and steady movement of the irrigation device. Each nozzle may also include an electronic control to increase or decrease the size and/or flow of water through the nozzle, and the system may monitor and make adjustments to the electronic control to ensure that the right amount of water is being applied. For example, as discussed herein, clay soils and sandy soils require different amounts of water. Also, during germination, fine seed requires steady water to survive, while once it takes root, less water may be used. The system may monitor and control the various aspects of the irrigation device to provide the benefits discussed herein, including in the methods discussed herein.

The foregoing detailed description describes the technology with reference to specific exemplary aspects. However, it will be appreciated that various modifications and changes can be made without departing from the scope of the present technology as set forth in the appended claims. The detailed description and accompanying drawings are to be regarded as merely illustrative, rather than as restrictive, and all such modifications, combination of features, or changes, if any, are intended to fall within the scope of the present technology as described and set forth herein. In addition, while specific features are shown or described as used in connection with particular aspects of the technology, it is understood that different features may be combined and used with different aspects. Numerous features from various aspects of the technology described herein may be combined in any number of variations as suits a particular purpose.

More specifically, while illustrative exemplary aspects of the technology have been described herein, the present technology is not limited to these aspects, but includes any and all aspects having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the technology should be determined solely by the appended claims and their legal equivalents, rather than by the descriptions and examples given above.

The invention claimed is:

1. A method of irrigating a field with an agricultural irrigation system coupled to a water supply and having water nozzles, the method comprising:
   causing the system to advance in a forward direction across the field for a first forward distance while dispersing water through the water nozzles;
   causing the system to reverse in a backward direction for a second reverse distance that is less than the first forward distance; and
   causing the system to readvance in the forward direction a third forward distance that is greater than the second reverse distance while dispersing water through the water nozzles.

2. The method of claim 1, further comprising:
   causing the system to repeatedly reverse and readvance while dispersing water through the water nozzles until a predetermined stop location is reached away from a start location of the system.

3. The method of claim 1, wherein the system comprises a pivot irrigation system with a hub, a water pipe extending therefrom, a wheeled tower carrying the water supply pipe, and the water pipe and the wheeled tower pivot about the hub; and wherein causing the system to advance, reverse and readvance further comprises:
   causing the system to advance in a forward arcuate direction for a first forward angle;

causing the system to reverse in a backward arcuate direction for a second reverse angle that is less than the first forward angle; and causing the system to readvance in the forward arcuate direction for a third forward angle that is greater than the second reverse angle.

4. The method of claim 1, wherein the system comprises a linear irrigation system with a pair of wheeled towers or wheels, a water supply pipe carried by and extending between the pair of wheeled towers or wheels, and the water supply pipe and the pair of wheeled towers or wheels being displaceable substantially linearly; and wherein causing the system to advance, reverse and readvance further comprises:

causing the system to advance linearly in the forward direction;

causing the system to reverse linearly in the backward direction; and causing the system to readvance linearly in the forward direction.

5. The method of claim 1, wherein the system further comprises a water pipe, a wheeled tower carrying the water pipe, a manifold movably carried by the wheeled tower and fluidly coupled to the water pipe, and drop lines pendant from the manifold; and wherein the method further comprises:

selectively raising or lowering the manifold and thus the drop lines.

6. The method of claim 5, wherein the system comprises a brace pivotally coupled to the wheeled tower and carrying the manifold; and wherein selectively raising or lowering the manifold and thus the drop lines further comprises:

pivoting the brace.

7. An agricultural irrigation system configured to disperse water on a field, the system comprising:

a water supply pipe couplable to a water source;

a wheeled support comprising at least two wheeled towers, the wheeled support carrying the pipe and displaceable across the field with the water supply pipe;

a manifold carried by the wheeled support substantially parallel with the water supply pipe and extending substantially a length of the wheeled support between the at least two wheeled towers;

a water line fluidly coupling the water supply pipe and the manifold; and drop lines pendant from the manifold configured to disperse water therefrom.

8. The system of claim 7, further comprising:

a driver coupled to the wheeled support and configured to displace the wheeled support and the water supply pipe;

a controller coupled to the driver and capable of:

advancing the wheeled support in a forward direction across the field for a first forward distance while water is dispersed through the drop lines;

reversing the wheeled support in a backward direction for a second reverse distance that is less than the first forward distance while water is dispersed through the drop lines; and readvancing the wheeled support in the forward direction a third forward distance that is greater than the second reverse distance while water is dispersed through the drop lines.

9. The system of claim 7, further comprising:

a brace pivotally coupled to the wheeled support and carrying the manifold; and the brace being pivotal to selectively raise and lower the manifold and thus the drop lines.

10. The system of claim 7, further comprising:

a fitting disposed in the water line between the water supply pipe and the manifold, the fitting comprising at least one of:

a male hose to male pipe thread adapter;

a valve;

a pressure regulator;

a flow control orifice;

a female swivel to male hose adaptor; or combinations thereof.

11. The system of claim 7, further comprising:

a fitting disposed between the manifold and an outlet of one of the drop lines, the fitting comprising at least one of:

a flow control orifice;

a capillary tube;

an air inlet orifice; or combinations thereof.

12. The system of claim 7, further comprising:

the manifold extending horizontally and in parallel with the water supply pipe.

13. The system of claim 7, further comprising:

the water supply pipe having a supply inlet;

the manifold extending horizontally and in parallel with the water supply pipe;

the manifold having a manifold inlet coupled to the water supply pipe farther from the supply inlet;

the manifold having a manifold outlet located closer to the supply inlet; and the manifold being configured to redirect water back in a direction towards the supply inlet.

14. The system of claim 7, wherein the drop line further comprises:

a flow control orifice located in the drop line;

a capillary tube located in the drop line and extending from the flow control orifice;

an air inlet orifice in the drop line adjacent the capillary tube; and an outlet bellow the air inlet orifice, the capillary tube, and the flow control orifice.

15. The system of claim 7, further comprising:

a pair of manifolds disposed on opposite sides of the water supply pipe; and drop lines extending from one manifold offset with respect to drop lines of the other manifold.

16. The system of claim 7, further comprising:

a filter located in and coupled to the water supply pipe, and coupled between the water supply pipe and the water line;

the filter having a cone with perforations; and the cone oriented to face downstream.

17. An agricultural irrigation system configured to disperse water on a field, the system comprising:

a water supply pipe couplable to a water source;

a wheeled support carrying the pipe and displaceable across the field with the water supply pipe;

a brace pivotally coupled to the wheeled support;

a manifold carried by the brace;

a water line fluidly coupling the water supply pipe and the manifold; and drop lines pendant from the manifold configured to disperse water therefrom.

* * * * *